UNITED STATES PATENT OFFICE.

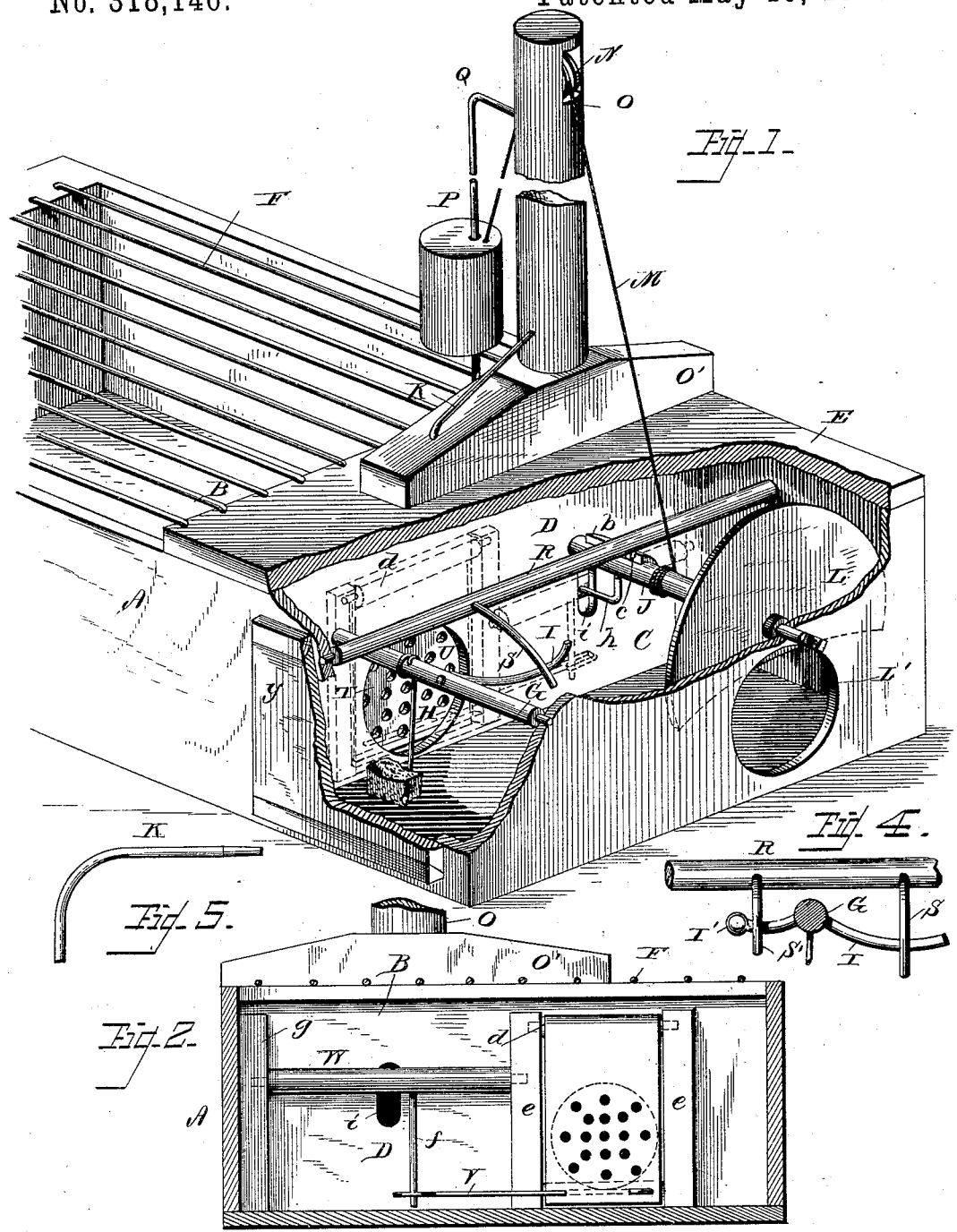

LEWIS N. B. SORRELL, OF WASHINGTON, DISTRICT OF COLUMBIA.

ANIMAL-TRAP.

SPECIFICATION forming part of Letters Patent No. 318,146, dated May 19, 1885.

Application filed July 23, 1884. (No model.)

*To all whom it may concern:*

Be it known that I, LEWIS N. B. SORRELL, a citizen of the United States, residing at Washington, in the District of Columbia, have invented certain new and useful Improvements in Animal-Traps; and I do hereby declare the following to be a full, clear, and exact description of the invention, such as will enable others skilled in the art to which it appertains to make and use the same, reference being had to the accompanying drawings, forming part thereof.

My invention relates to animal-traps, particularly to that class of traps which, after trapping the animal, will be set by the victim; and it has for its object to simplify and cheapen the construction of such traps and to insure the positive action of the same; and to those ends it consists in the construction and the combination of parts hereinafter particularly described, and specified in the claims.

Figure 1 of the drawings is a perspective of the trap with portions broken away; Fig. 2, a cross-section through the same, taken on a line back of the partition separating the two compartments and looking from the rear of the trap. Fig. 3 is a detail view of the winding-shaft partly in section and partly broken away. Fig. 4 is a detail view of the tripping-shaft and bait-shaft, showing the preferred way of arranging the arms through which motion is transmitted from one shaft to the other. Fig. 5 is a detail view of a winding-key.

In the drawings the letter A designates the body of the trap made of wood, metal, or other material, and preferably with closed sides and ends, although they may be made slatted, grated, or apertured if desired. The body is divided into two compartments, B and C, by a cross partition, D, and the compartment C has preferably a closed top, E, while the other compartment has an open or grated top formed by a series of slats, or, as illustrated, by wires F. Within the compartment C a shaft, G, is journaled, one end in the partition D and the other end in the body portion, which shaft carries a bait-hook, H, and a laterally-projecting arm, I, although there may be and preferably is another arm, I', attached to the shaft and projecting in the opposite direction to the arm I, as shown in Fig. 4. These arms may be made of wire or other material, and are preferably slightly curved, as shown, so as to preserve connection between them and certain other arms, hereinafter to be described, and may be of such weight as to balance each other. Another shaft, J, designated the "winding-shaft," is journaled preferably near the opposite side of the compartment, one end bearing in the partition D and the other in the end of the body portion of the trap, and preferably extending to the outside thereof, where it is provided with a shank, $a$, made angular or perforated, or otherwise formed to receive a winding-key, K, of the form shown in Fig. 5, or other form to fit to the shank of the shaft. This shaft carries a door, L, preferably of bisected disk form with its plane edge preferably slightly curved inwardly, as shown by dotted lines in Fig. 1, the door being designed at proper times to close an opening, L', in the end portion of the compartment. The door being of the form described, has a tendency to fall from the position shown in Fig. 1 with its peripheral face or edge upward to a position with the same face or edge downward when the shaft is permitted to turn. A rope or cord, M, at one end is attached to said shaft, and is passed upward over a pulley, N, in a standard, O, and is connected at its other end to a weight, P, which is free to slide up and down on a guide-rod, Q, which passes through the weight, and is secured at its lower end to the top of the compartment C, and bent at its upper end, and united to the standard O. It is obvious, however, that both ends of the rod may be bent and secured to the standard, so as to permit the weight to rise and fall. The standard O is shown as secured to the top of the compartment C by a base-block, O', but it is obvious that such block may be omitted. The shaft J is also provided with a shoulder, $b$, preferably of the cam-form shown, with which engages a catch formed by a pin, $c$, on a shaft, R, when the door is raised so as to hold the door in such position. The shaft R is journaled in opposite sides of the compartment C, and is provided with one or more arms, S S', projecting laterally therefrom, and adapted to engage with one or both arms I and I', as one or both sets of arms may be used. The arms S S' also tend by their weight to restore the shaft R to its first position after it has been raised by arms I I' bearing against arms S S'. An opening, T, is formed in partition D, preferably near the bait-hook, and is closed normally by a door, U, hinged at its upper end preferably by connection to a shaft, $d$, journaled in suitable bearings, $e$. The door is preferably perforated for the passage of light from the compartment B, and to its lower end there is connected an arm, V, which extends beyond its side, and is slotted at its outer end for the passage of an arm, $f$, extending down from a shaft, W, journaled at one end in one of the bearings $e$ and at the other end in a suitable bearing, $g$. The shaft W is also provided with an arm, $h$, which projects through a slot, $i$, made in the partition D, and extends within such proximity to the shoulder $b$ as to engage therewith under certain circumstances and form a stop to the rotation of the shaft. The outer end of the compartment B will be provided with a door (not shown) for the removal of the animals from the compartment, and a sliding door, Y, will be formed in one side of compartment C for baiting the hook H. When the key K is not in use, it may be held to the trap against liability of loss by passing its bent end into the block O' with its other end bearing against the standard O, as shown in Fig. 1.

For operation the hook is baited through door Y. The key is applied to the end of the winding-shaft J, and the latter turned till the cord M is wound up thereon and the weight P is raised the desired height with the door L lifted above the opening L' so that the rat or other animal to be trapped may pass into compartment G. When the parts are in such position, the catch of the tripping-shaft R is in engagement with the shoulder on winding-shaft, as shown in Fig. 1, so as to hold the parts in the position there shown ready to entrap. Now, when the animal pulls at the bait it turns the bait-shaft, so that the arms thereon are caused to bear against the arms of the tripping-shaft so as to turn the latter and lift the catch from engagement with the shoulder on the winding-shaft, when the weight P, acting on said shaft through cord M, will turn the latter till the door L is turned down and the opening L' closed, and the shaft turned enough to bring the shoulder in contact with the arm $h$ of shaft W, which checks the turning of the winding-shaft and holds the door L closed. Next, the animal is attracted by the light through door U, and in passing through opening T pushes the door forward, so that through arm V and arm $f$ the shaft W is turned so as to throw down the arm $h$ and release the winding-shaft, so that the weight acting thereon may turn it so as to lift door L and bring the shoulder once more against the catch on the tripping-shaft, which has been returned to its first position by the weight of arm S or S'. The door U having been closed after the passage of the animal from under it by the weight of arm V, and the latter having moved the shaft W and its arm $h$ to their normal position, the trap is ready to entrap another animal, the one caught being caged in the compartment B. It will thus be seen that the trap is set every time an animal passes from compartment C into compartment B, and that any number of animals may be entrapped without the necessity of setting the trap by hand every time an animal is caught. When two sets of arms are used on the tripping-shaft and the bait-shaft, the former will be operated no matter in which direction the bait-hook is moved. It is obvious, too, that the parts may be made of any suitable material and shape, and that alterations may be made in their arrangement without departing from my invention.

Having described my invention and set forth its merits, what I claim is—

1. In an animal-trap, the combination of a rotatable winding-shaft carrying a door and provided with a shoulder, a weight connected to said shaft by a cord or rope, a rotatable trip-shaft provided with a catch to engage with the shoulder on the winding-shaft, a bait-hook having a connection with said tripping-shaft, and a stop to check the rotation of the winding-shaft, whereby the tripping-shaft will be operated from the bait-hook to close the door, and the said stop will check the movement of the door across its opening, substantially as described.

2. In an animal-trap, the combination of a rotatable winding-shaft carrying a door and provided with a shoulder, a weight connected to said shaft by a cord or rope, a rotatable trip-shaft provided with a catch to engage with the shoulder on the winding-shaft, a rotatable shaft carrying a bait-hook and having a connection with the trip-shaft, and a stop to check the rotation of the winding-shaft, substantially as and for the purposes described.

3. In an animal-trap having two compartments, the combination of a rotatable winding-shaft carrying a door and provided with a shoulder, a weight connected to said shaft by a cord or rope, a rotatable trip-shaft provided with a catch to engage with the shoulder on the winding-shaft, a bait-hook having a connection with said trip-shaft, a door closing an opening between the two compartments, and a stop to engage with the shoulder on the winding-shaft to check the rotation of the latter, said stop having a connection with the door between the two compartments and operated by the movement of said door to release the winding-shaft, substantially as described.

4. In an animal-trap having two compartments, the combination of the rotatable shaft carrying a door and provided with a shoulder, a movable shaft provided with an arm to engage with said shoulder, and a door to control an opening between the two compartments having a connection with the shaft carrying said arm, whereby the movement of said door will operate said shaft to move its arm from the shaft having the shoulder, substantially as described.

5. In an animal-trap, the combination of the rotatable shaft carrying the door and provided with a shoulder, a rotatable trip-shaft provided with a catch to engage said shoulder, a rotatable shaft carrying a bait-hook, and arms connecting said trip and bait shafts, substantially as and for the purposes described.

6. In an animal-trap having two compartments, the combination of a rotatable winding-shaft carrying a door and provided with a shoulder, a weight connected to said shaft by a rope or cord, a rotatable trip-shaft provided with a catch to engage with the shoulder on the winding-shaft, a rotatable shaft carrying a bait-hook and having a connection with the trip-shaft, a door closing an opening between the two compartments, a movable shaft having an arm to engage with the shoulder on the winding-shaft, and an arm connecting said door and shaft carrying said arm, whereby the door on the winding-shaft will be closed by interference with the bait-hook and opened by movement of the door between the two compartments, substantially as described.

In testimony whereof I affix my signature in presence of two witnesses.

LEWIS N. B. SORRELL.

Witnesses:
FRANKLIN H. HOUGH,
WM. G. HENDERSON.